United States Patent
Ingram, II

[15] 3,666,694
[45] May 30, 1972

[54] EMULSIFIABLE PHENOLIC RESIN COMPRISING A RESOLE AND A SOLUBLE PROTEIN

[72] Inventor: Woodrow Hayes Ingram, II, Hampden, Mass.

[73] Assignee: Monsanta Company, St. Louis, Mo.

[22] Filed: May 5, 1971

[21] Appl. No.: 140,554

Related U.S. Application Data

[63] Continuation-in-part of Ser. No. 7,197, Jan. 30, 1970, abandoned.

[52] U.S. Cl. ..................260/7, 117/124 E, 117/143 A, 117/161 L, 117/161 UN, 117/164, 260/29.3, 260/51.5
[51] Int. Cl. ................C08g 37/16, C08g 37/18, C08g 37/20
[58] Field of Search.......................................260/7

[56] References Cited

UNITED STATES PATENTS

| | | | |
|---|---|---|---|
| 2,555,605 | 6/1951 | Porter | 260/7 |
| 2,636,829 | 4/1953 | Smith et al. | 260/7 X |
| 3,288,734 | 11/1966 | Stalego et al. | 260/7 |
| 3,326,825 | 6/1967 | Clougherty et al. | 260/7 X |
| 3,513,126 | 5/1970 | Ehlers et al. | 260/51.5 |
| 3,547,844 | 12/1970 | Holtbach et al. | 260/7 |

Primary Examiner—Howard E. Schain
Attorney—William J. Farrington, James C. Logomasini, Neal E. Willis and Donald W. Peterson

[57] ABSTRACT

An emulsifiable phenol-formaldehyde resole resin system and emulsions prepared therefrom which exhibit improved stability. The thermoset resin products prepared from these emulsions also display improved water resistance.

15 Claims, No Drawings

EMULSIFIABLE PHENOLIC RESIN COMPRISING A RESOLE AND A SOLUBLE PROTEIN

CROSS REFERENCE TO RELATED APPLICATION

This application is a continuation-in-part of co-pending application Serial Number 7,197, filed January 30, 1970 and now abandoned.

BACKGROUND OF THE INVENTION

1. Field of the Invention

The present invention relates to emulsifiable, liquid, homogeneous, one phase phenol-formaldehyde resole resins and to emulsions prepared therefrom using a proteinaceous compound in combination with the resole resin.

2. Description of the Prior Art

The concept of phenolic resin emulsions is in general well known in the prior art and such emulsions have been recommended for use in impregnations and beater additive applications. However, the emulsions heretofore described have been made either with modified phenol resins, prepared with, e.g., cresol, tung-oil modified phenol, sulfonated phenol and the like. The emulsifiers used have been a combination of a protective colloid and a surfactant which is a salt of an organic acid, such as sulfonated vegetable oil, or sodium oleate. Furthermore the phenolic resin emulsions of the prior art have formerly been prepared by adding solutions of phenolic resoles in organic solvents to a solution of emulsifier and/or protective colloid with very vigorous agitation. This required the use of a colloid mill or gear pump in order to obtain emulsification. Alternately, the phenolic resin was dissolved in a water insoluble solvent and the solution then emulsified with various combinations of protective colloid and surfactant such as casein and sulfonated vegetable oil and the water insoluble solvent subsequently removed.

SUMMARY OF THE INVENTION

The present invention is directed to a liquid, homogeneous, one phase, emulsifiable resole phenolic resin system comprising:

A. from about 50 to 80 weight percent total solids with the balance up to 100 weight percent thereof being volatile inert solvent liquids, B. the solvent liquids comprising (on a 100 weight percent resin system basis) from 0 to about 45 weight percent of an organic liquid boiling in the range from about 30° to 150° C. with the balance up to 100 weight percent thereof being water, C. the total solids present in said resin system comprising on a 100 weight percent total solids basis:

1. from about 88 to 99 weight percent of a phenol-formaldehyde resole condensate having a free formaldehyde content of 1.5 percent maximum, which condensate is further characterized as being in a one phase condition, with a water dilutability of from 15 per cent to 2,000 percent, based on resin solids, and 2. from about 1 to 12 weight percent of a proteinaceous compound soluble in an aqueous media at a pH of from 7 to 10.

Optionally and preferably, the resins solids as above described also include from about (on a 100 weight percent total solids basis) 1 to 15 weight percent of urea and/or dicyandiamide (assuming a corresponding or appropriate reduction in this amount of phenol-formaldehyde condensate).

The organic liquid as described above used in this invention is generally chosen so as to be substantially inert (as respects the solids) and also is chosen so as to be a mutual solvent for both the solids and the water.

The organic liquid can comprise mixtures of different organic molecules. Preferred organic liquids comprise lower alkanols (such as ethanol, methanol, isopropanol, etc.) and lower alkanones (such as acetone or methylethyl ketone). The term "lower" refers to less than 7 carbon atoms per molecule as used herein.

Those skilled in the art will appreciate that care should preferably be taken when using this procedure to use an organic liquid system in which the phenolic resole resins are completely soluble as well as any water present. Adding, for example, methanol generally improves the water tolerance (ability to dissolve water) of a resin system.

As made, these liquid, emulsifiable resins are characteristically colored, one-phase, clear liquid solutions having a viscosity ranging from about 50 to 10,000 centipoises, the exact viscosity of a given liquid resin depending upon chemical process and product variables used in manufacture.

The present invention is also directed to emulsified resin systems made using the liquid resin systems just described and adding water thereto with agitation sufficient to produce an emulsion. When water is added to form an emulsion, characteristically, there is first produced a water in resin emulsion. As more water is added, the viscosity increases until the emulsion inverts to a resin in water emulsion. At the point of inversion, the viscosity decreases with the addition of more water. Characteristically, emulsions of this invention invert to resin in water emulsions from water in resin emulsions at total solids contents ranging from about 5 to 45 percent (as determined by ASTM Test Procedure No. D 115–55).

Phenol-formaldehyde resole condensates are well known to those familiar with the art. In general, suitable phenol-formaldehyde resole condensates may be prepared by first condensing from about 0.85 to 3 moles of formaldehyde per mole of phenol using an alkaline catalyst. The condensation is continued until a predetermined Ostwald viscosity is reached.

It is necessary to keep the free formaldehyde content of the resole condensate below 1.5 percent maximum in order to permit and facilitate subsequent blending of the proteinaceous protective colloid (which is described in detail below) with the resole condensate. If the free aldehyde content of the resole condensate is greater than 1.5 percent, gelation of the protective colloid occurs rendering the system non-emulsifiable.

In addition, the phenol-formaldehyde resole condensate must have a water dilutability of from 15 percent to 2,000 percent by weight based on resin solids. Water dilutability is a measure of resin advancement and if dilutability is too high, the resin will not form an emulsion but rather a solution in the solids range previously mentioned. Furthermore, if the degree of water dilutability is too low then the resin system will either require large amounts of organic solvent to insure a homogeneous one phase condition or will have prohibitively short storage life.

Preferred phenol-formaldehyde resole resins are those which are modified with melamine. In one preferred procedure, melamine is added initially with the phenol and formaldehyde and condenses with formaldehyde concurrently with the phenol. In another preferred procedure, the melamine is added after the formaldehyde and phenol have partially methylolated. In another procedure, melamine-formaldehyde condensate separately prepared is added to a phenol-formaldehyde condensate. In general, the resulting melamine modified product contains from about 2 to 25 weight percent of melamine based on 100 parts of phenol.

Melamine modified resins are preferred because of the improved stability found in emulsion prepared from the melamine modified resoles of the present invention. For example, these emulsions exhibit substantially no sedimentation even upon storage for six months at room temperature.

The alkali solubilizable proteinaceous compounds used in this invention are well known to those of ordinary skill in the art. In general, they are amphoteric but are used in the present invention only at a pH of from 7 to 10.

Suitable aqueous solutions of the proteinaceous compound may therefore be prepared in the presence of alkali and alkaline earth metal hydroxides, ammonium hydroxide, organic amines, e.g., urea, dicyandiamide, triethyl amine, and the like as well as mixtures of the foregoing. The most commonly used proteinaceous materials of this type are casein and soya proteins; common molecular weights range from 100 to 400 thousand.

The clear, one phase, homogeneous, emulsifiable resins of this invention may be easily converted to resin in water emulsions by the simple addition of water with sufficient agitation to permit effective blending of the water. This can normally be accomplished with the use of conventional propellor type agitators. Depending upon the degree of dilutibility of the emulsifiable resin, i.e., degree of advancement, the formation of phenolic resole emulsion may be first characterized by a slight lowering of viscosity as the initial water added dissolves, followed by a rapid increase in viscosity with the formation of a water-in-oil emulsion and a peak viscosity at the point at which the system inverts to a resin in water emulsion. Such is the case with relatively high degree of advancement of emulsifiable resin systems having a relatively low degree of water dilutibility, e.g., 20 percent. Alternately, with lower advanced phenolic resole emulsifiable resins, emulsification may be accompanied by no noticeable increase in viscosity and result directly in a resin in water emulsion.

In either case, the resin in water emulsions formed are characterized by excellent stability with regard to sedimentation and shear. Particle size is also extremely small, in all cases being below 2 $\mu$ and normally averaging 0.02–0.8 $\mu$.

The emulsified resin systems of this invention are useful in the impregnation of cellulosic sheet members. Typical resin solids contents of the emulsified phenolic for cellulosic sheet impregnation range from about 5 percent up to 45 weight percent resin solids. Commonly, the quantity of resin falls in the range of from about 8 to 25 percent solids. Impregnation is accomplished by any convenient means including dipping, coating, or the like. After impregnation, the substrate material is dried to lower volatiles content and then is heated to advance the resin to a desired degree. Typical quantities of resin in a treated sheet range from about 10 to 40 weight percent with amounts ranging from about 15 to 30 weight percent being particularly common. A typical product in which the resin treated sheet members are employed comprises automotive oil filters, air filters and fuel filters, the individual sheets being folded, convoluted, etc. and then packaged in an appropriate filter cartridge, all as those skilled in the art fully appreciate.

DESCRIPTION OF THE PREFERRED EMBODIMENTS

The following examples are set forth to illustrate more clearly the principles and practices of this invention to one skilled in the art, and they are not intended to be restrictive but merely to be illustrative of the invention herein contained. Unless otherwise stated herein, all parts and percentages are on a weight basis.

EXAMPLE 1

The product of this example is a highly advanced, emulsifiable phenolic resin for treating filter paper. Sodium caseinate is the main emulsifier. The following starting materials are used:

| Material | Parts |
|---|---|
| Phenol | 100 |
| 50% Formalin | 85 |
| Melamine | 5 |
| 50% Caustic Solution (NaOH) | 1.66 |
| Methanol | 41 |
| Water | 15 |
| Prilled Urea | 6.50 |
| Casein | 6.50 |
| 50% Caustic Solution (NaOH) | 0.38 |

Phenol, 50 percent formalin, melamine and 50 percent caustic solution are heated under vacuum to atmospheric reflux. The reaction proceeds for 80 minutes after reflux starts. At the end of reflux, the resin is cooled with vacuum and allowed to level at 50° ± 2° C. under 27 inch vacuum. It is then dehydrated to a refractive index of about 1.60. At the end of dehydration, approximately 41 parts of methanol are charged. Finally, a premixed casein solution is added with agitation. A clear, amber colored fluid results having a free formaldehyde content of 0.5 percent and a water dilutability of about 50 percent.

Premixing of the casein is accomplished as follows: The urea is dissolved in water and the casein is added and slurried. After 30 minutes, the caustic solution is added and allowed to mix for 30 minutes. This solution may then be added to the resin. The product resin has a total solids content (measured by ASTM Test Procedure No. D 115–55) of about 60 percent.

The foregoing resin is emulsified as follows: Water is added to the resin with sufficient agitation to form an emulsion. It is observed that the agitation is sufficient to prevent formation of lumps. First a water in resin emulsion is formed. As water is added the viscosity increases until the emulsion inverts to a resin in water emulsion, at which point the viscosity decreases with the addition of more water. The product emulsion is observed to be infinitely dilutable with water. The resin in water emulsion is storage stable and mechanically stable. The emulsion is observed to reach a peak viscosity and invert from a water in resin emulsion to a resin in water emulsion at about 42 percent solids (as determined by ASTM Test Procedure No. D 115–55).

When a resin in water emulsion prepared as just described and having a solids content of about 10 percent (same procedure) is cast onto a glass plate, 5 × 7 inches, and then oven dried at a temperature of about 150° C. for 10 minutes, there is produced a thermoset resin film which displays excellent water resistance.

EXAMPLE 2

The procedure and starting materials of Example 1 are repeated except that after the alcohol has been added, but before the casein solution addition, the resin is further advanced by refluxing the system at about 80° C. until the product achieves a gel time of about 7–9 minutes, as determined by using a so-called General Electric Gel Test.

The product resin, when water is similarly added, has properties like those associated with the product of Example 1, and, in addition, when a film on glass is similarly cast and air dried at 25° C. for 2 hours, the product film is observed to be substantially non-tacky demonstrating that the product resin is substantially free from sticking tendencies on industrial paper treating equipment when this resin is used for paper sheet impregnation. When this air dried film is then oven dried as in Example 1, the product thermoset film is found to display excellent water resistance.

EXAMPLE 3

| Material | Parts |
|---|---|
| Phenol | 100 |
| 50% Formalin | 85 |
| Melamine | 5 |
| 50% Caustic Solution (NaOH) | 1.66 |
| Ethanol | 5 |
| Water | 36 |
| Urea | 6.50 |
| Casein | 5.40 |
| 28% Ammonia | 0.94 |

This reaction proceeds as in Example 1 except that the methanol solvent is replaced by ethyl alcohol. The protective colloid (casein) is prepared as in Example 1 except that the 50 percent sodium hydroxide is replaced by a 28 percent ammonia solution. The product resin has a total solids content (measured by ASTM Test Procedure No. D 115–55) of about 64 percent.

The foregoing resin is emulsified as in Example 1. The product emulsion is observed to be infinitely dilutable with water. The resin in water emulsion is storage stable and mechanically stable. The emulsion is observed to reach a peak viscosity and invert from a water in resin emulsion to a resin in water emulsion at about 45 percent solids (as determined by ASTM Test Procedure No. D 115–55).

When a resin in water emulsion prepared as just described and having a solids content of about 10 percent (same procedure) is cast onto a glass plate 5 × 7 inches and then oven dried at a temperature of about 150° C. for 10 minutes there is produced a thermoset resin film which displays excellent water resistance.

EXAMPLE 4

The following starting materials are used:

| | |
|---|---|
| Phenol | 100 |
| 50% Formalin | 85 |
| Melamine | 5. |
| 50% Caustic Solution (NaOH) | 1.66 |
| Water | 36 |
| Urea | 6.5 |
| Casein | 5.4 |
| 28% Ammonia | 0.94 |

The reaction proceeds as in Example 1 except that the alcohol solvent is replaced by water resulting in a completely aqueous system. The protective colloid (casein) is prepared as in Example 1 except that the 50 percent sodium hydroxide solution is replaced by a 28 percent ammonia solution. This product resin has a total solids content (measured by ASTM Test Procedure No. D 115–55) of about 64 percent.

The foregoing resin is emulsified as in Example 1. The product emulsion is observed to be infinitely dilutable with water. The resin in water emulsion is storage stable and mechanically stable. The emulsion is observed to reach a peak viscosity and invert from a water in resin emulsion to a resin in water emulsion at about 45 percent solids (as determined by ASTM Test Procedure No. D 115–55).

When a resin in water emulsion prepared as just described and having a solids content of about 10 per cent (same procedure) is cast onto a glass plate 5 × 7 inches and then oven dried at a temperature of about 150° C. for 10 minutes, there is produced a thermoset resin film which displays excellent water resistance.

EXAMPLE 5

The starting materials and procedure of Example 1 are repeated except that the urea is eliminated. There is produced a product emulsifiable resin which, when emulsified by the procedure of Example 1, has inversion characteristics and water resistance characteristics like those of Example 1.

EXAMPLE 6

The starting materials and procedure of Example 1 are repeated except that dicyandiamide is used in place of urea. There is produced a product emulsifiable resin which, when emulsified by the procedure of Example 1, has inversion characteristics and water resistance characteristics like those of Example 1.

The ASTM solids Test D 115–55 is run at 135° C. throughout the present invention.

EXAMPLE 7

The following starting materials are used:

| Material | Parts |
|---|---|
| Phenol | 100 |
| 50% Formalin | 85 |
| Melamine | 5 |
| 50% Caustic Solution (NaOH) | 1.66 |
| Methanol | 41 |
| Water | 15 |
| Prilled Urea | 6.50 |
| Casein | 6.50 |
| 28% Ammonia | 0.94 |

The procedure is the same as in Example 2 except the 28 percent ammonia is used in place of the 50 percent caustic solution.

Product properties are equivalent to those of Example 2.

EXAMPLE 8

Example 1 is repeated here except that 80 parts of formalin are used and the melamine is omitted. The resulting resole condensate is formulated as in Example 1 and used to prepare a resin in water emulsion at about 35 percent solids. The emulsion is diluted with water to about 10 percent solids, cast onto a glass plate, 5 × 7 inches, and then oven dried at a temperature of about 150° C. for 10 minutes to produce a thermoset resin film which displays excellent water resistance.

EXAMPLE 9

The general procedures of Example 2 are repeated here using the resole condensate prepared in Example 8. Air dried films on glass are found to be substantially non-tacky demonstrating that the present resin is substantially free from sticking tendencies on industrial paper treating equipment when this resin is used for paper sheet impregnation. Oven dried films are found to display excellent water resistance.

EXAMPLE 10

In this example the starting materials are the same as those used in Example 8. Phenol, 50 percent formalin and 50 percent caustic solution are heated under vacuum to an 80° C. reflux. The reaction proceeds for 3 hours after reflux starts. At the end of reflux, the resin is cooled with vacuum and allowed to level at 50° ± 2° C. under 27 inch vacuum. It is then dehydrated to a refractive index of about 1.60. At the end of dehydration, the premixed casein solution is added with agitation. A clear, amber colored fluid results which has a free formaldehyde content of 1.2 percent and a water dilutability of about 400 percent.

The foregoing resin is emulsified as follows: Water is added to the resin with sufficient agitation to form an emulsion. As water is added, viscosity decreases to a point at which the solution inverts to an emulsion. The product emulsion is observed to be infinitely dilutable with water. The resin in water emulsion is storage stable and mechanically stable. The emulsion is observed to invert to an emulsion at about 25 percent solids (as determined by ASTM Test Procedure No. D 115–55).

When a resin in water emulsion prepared as just described and having a solids content of about 10 percent (same procedure) is cast onto a glass plate, 5 × 7 inches, and then oven dried at a temperature of about 150° C. for 10 minutes, there is produced a thermoset resin film which displays excellent water resistance.

EXAMPLE 11

The starting materials and procedure of Example 8 are repeated except that soya protein replaces the casein used in Example 8. The resulting product is an emulsifiable resin which, when emulsified by the procedure of Example 8, has inversion characteristics and water resistance characteristics like those of Example 8.

What is claimed is:

1. A liquid, homogeneous, one phase, emulsifiable resole phenolic resin system comprising:
  A. from about 50 to 80 weight percent total solids with the balance up to 100 weight percent thereof being volatile inert solvent liquids,
  B. the solvent liquids comprising (on a 100 weight percent resin system basis) from 0 to about 45 weight percent of an organic liquid boiling in the range from about 30° to 150° C. with the balance up to 100 weight percent thereof being water,
  C. the total solids present in said resin system comprising on a 100 weight percent total solids basis:
    1. from about 88 to 99 weight percent of a phenol-formaldehyde resole condensate having a free formaldehyde content of 1.5 percent maximum, which condensate is further characterized as being in a one phase condition, with a water dilutability of from 15 percent to 2,000 percent, based on resin solids, and
    2. from about 1 to 12 weight percent of a proteinaceous compound soluble in an aqueous media at a pH of from 7 to 10.

2. An emulsifiable resin system as in claim 1 wherein the phenol-formaldehyde resole resin is modified with melamine.

3. An emulsifiable resin system as in claim 1 containing in addition from about 1 to 15 weight percent of a material selected from the class consisting of urea and dicyandiamide (assuming a reduction in the amount of phenol-formaldehyde condensate for the amount of added material).

4. A emulsifiable resin system as in claim 1 wherein the proteinaceous compound is casein.

5. An emulsifiable resin system as in claim 1 wherein the proteinaceous compound is soya protein.

6. An emulsifiable resin system as in claim 1 containing from 1 to 7 percent by weight of casein.

7. A liquid, homogeneous, one phase, emulsifiable resole phenolic resin system comprising:
   A. from about 50 to 80 weight percent total solids with the balance up to 100 weight percent thereof being volatile inert solvent liquids,
   B. the solvent liquids comprising (on a 100 weight percent resin system basis) from 0 to about 45 weight percent of an organic liquid boiling in the range from about 30° to 150° C. with the balance up to 100 weight percent thereof being water,
   C. the total solids present in said resin system comprising on a 100 weight percent total solids basis:
      1. from about 88 to 99 weight percent of a melamine modified phenol-formaldehyde resole condensate having a free formaldehyde content of 1.5 percent maximum, which condensate is further characterized as being in a one phase condition, with a water dilutability of from 15 percent to 2000 percent, based on resin solids,
      2. from 0 to 15 percent by weight of a material selected from the group consisting of urea and dicyandiamide, with the proviso that the total amount of melamine modified phenol-formaldehyde resole condensate, urea and dicyandiamide is in the amount of from 88 to 99 weight percent; and
      3. from about 1 to 12 weight percent of a proteinaceous compound soluble in an aqueous media at a pH of from 7 to 10 selected from the group consisting of casein and soya protein.

8. A highly stable thermosetting phenol-formaldehyde resole resin in water emulsion comprising:
   A. a phenol-formaldehyde resole resin condensate of claim 1; and
   B. sufficient water to provide a resin solids content of from 5 to 45 percent in the emulsion;
   wherein the emulsion is characterized by having a particle size in the range of from 0.01 to 2.0 microns.

9. An emulsion as in claim 8 wherein the phenol-formaldehyde resole resin is modified with melamine.

10. An emulsion as in claim 8 containing in addition from about 1 to 15 weight percent of a material selected from the class consisting of urea and dicyandiamide (assuming a reduction in the amount of phenol-formaldehyde condensate for the amount of added material).

11. An emulsion as in claim 8 wherein the proteinaceous compound is casein.

12. An emulsion as in claim 8 wherein the proteinaceous compound is soya protein.

13. An emulsion as in claim 8 containing from 1 to 7 percent by weight of casein.

14. A highly stable thermosetting phenol-formaldehyde resole resin in water emulsion comprising:
   A. a melamine modified phenol-formaldehyde resole resin condensate of claim 7; and
   B. sufficient water to provide a resin solids content of from 5 to 45 percent in the emulsion;
   wherein the emulsion is characterized by having a particle size in the range of from 0.01 to 2.0 microns.

15. A cellulosic substrate impregnated with the emulsion of claim 8.

* * * * *

PO-1050
(5/69)

UNITED STATES PATENT OFFICE
CERTIFICATE OF CORRECTION

Patent No. 3,666,694      Dated  May 30, 1972

Inventor(s)   Woodrow H. Ingram, II

It is certified that error appears in the above-identified patent and that said Letters Patent are hereby corrected as shown below:

Cover Page, Line 73, "Monsanta" should read
- - - Monsanto - - -.

Signed and sealed this 24th day of October 1972.

(SEAL)
Attest:

EDWARD M. FLETCHER, JR.  
Attesting Officer

ROBERT GOTTSCHALK  
Commissioner of Patents